Feb. 13, 1934.  C. E. KILBOURNE ET AL  1,947,265
SYSTEM OF MOTOR CONTROL
Filed Aug. 6, 1932
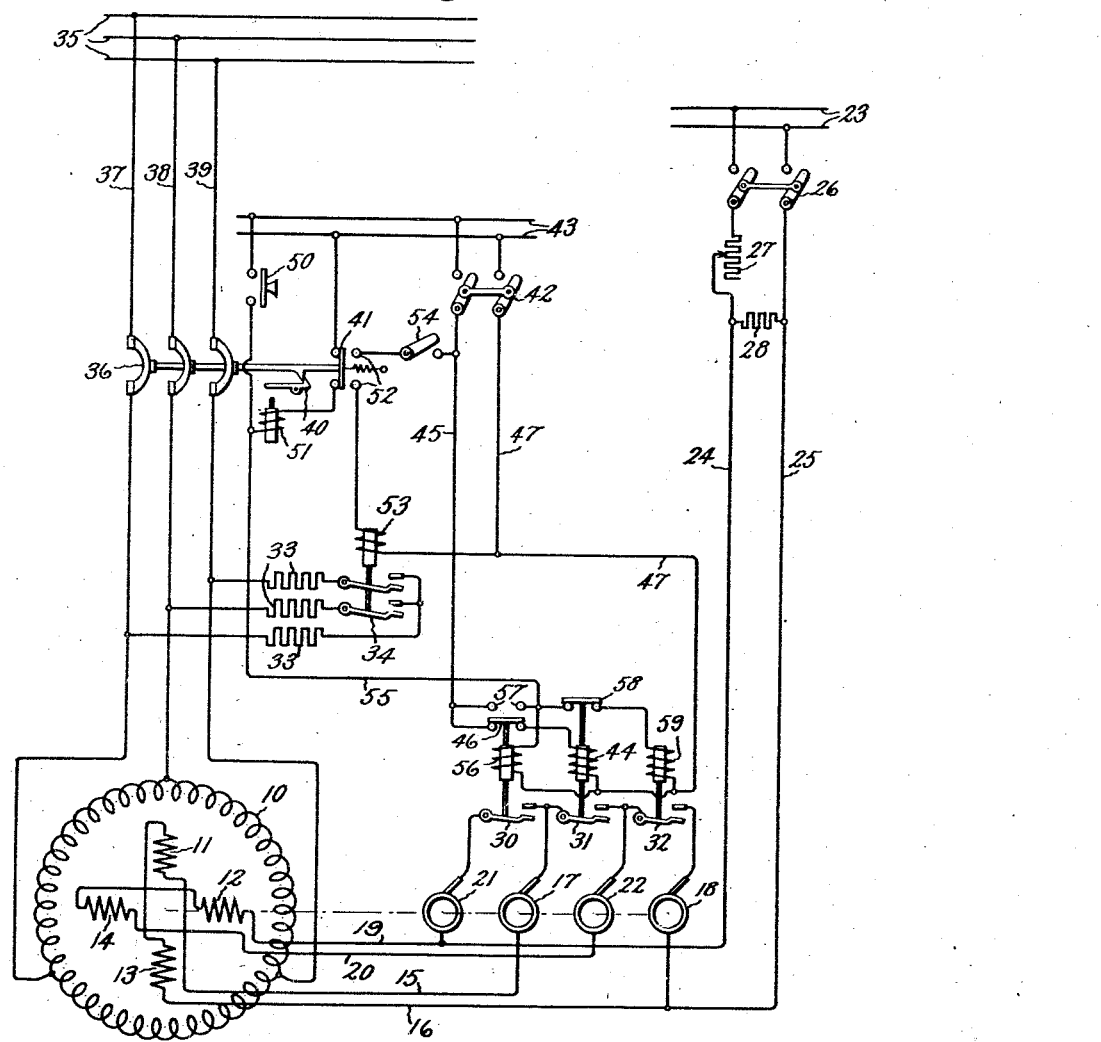
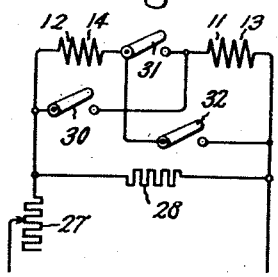
Inventors:
Theodore Dreier,
Charles E. Kilbourne.
by Charles E. Tullar
Their Attorney.

Patented Feb. 13, 1934

1,947,265

UNITED STATES PATENT OFFICE 1,947,265

SYSTEM OF MOTOR CONTROL

Charles E. Kilbourne, Schenectady, N. Y., and Theodore Dreier, Winter Park, Fla., assignors to General Electric Company, a corporation of New York Application August 6, 1932. Serial No. 627,780

15 Claims. (Cl. 172—274)

Our invention relates to systems of motor control, more particularly to control systems for synchronous motors and has for its object a simple, reliable and effective means for and method of changing the connections of the field windings so as to provide for increased field excitation.

In the control of motors, especially alternating current synchronous motors, it is desirable to increase the field excitation during certain periods, for example, in stopping the motor to provide increased dynamic braking to bring the motor to rest in the shortest possible time and travel of the rotor. To provide for this, the field windings may be connected in series during normal running conditions and then connected in parallel to give increased excitation. In changing the connections from series to parallel the usual procedure is to first open the field circuit and then reconnect the windings in parallel. This method has two serious disadvantages. First, very undesirable arcing results from the opening of the field circuit and second, a very great decrease in effective field excitation takes place due to the opening of the field circuit with consequent decrease in braking effect.

In carrying out our invention we connect the field windings for switching purposes in two groups or sets of respectively north and south pole field windings, these two sets being connected in series with each other across the field excitation supply source for normal excitation. In changing the connections to parallel for double excitation, one set of field windings is first connected directly across the supply source to maintain the existing field excitation of the motor. This connection is made without opening any part of the field circuit. A series connection between the two sets of field windings is next opened, which may then be done without damaging arcing, and finally the second set of field windings is connected directly to the supply source in parallel with the first.

For a more complete understanding of our invention reference should be had to the accompanying drawing, Fig. 1 of which is a diagrammatic representation of a complete braking system embodying our invention, while Fig. 2 is a simplified diagrammatic representation of the switching means for the field windings.

Referring to the drawing we have shown our invention in one form as applied to the control of an alternating current synchronous motor comprising a three-phase armature winding 10 mounted on a stator member and field windings 11, 12, 13 and 14 mounted on a rotor member. While only four field windings constituting the same number of poles are shown for purposes of illustration and while the windings are shown divided into only two groups or sets for switching purposes, it will be understood that our invention is not limited to this number of field poles or divisions of the field windings. The field windings 11 and 13, constituting one group or set, excite poles of like polarity, such as north. These windings are connected in series with each other by means of the conductors 15 and 16 to the slip rings 17 and 18 which are mounted on the rotor shaft of the motor in insulated relation therewith. In like manner the south pole windings 12 and 14 constituting the other group or set are connected in series by conductors 19 and 20 to the slip rings 21 and 22 also mounted on the rotor shaft.

The field windings are energized from a suitable direct current source of supply 23 through the conductors 24 and 25 which are connected to the slip rings 21 and 18 respectively. The field circuit is provided with a disconnecting switch 26 for removing the field together with a variable resistance 27 by means of which the field strengths may be adjusted. Also a high resistance discharge resistor 28 is connected across the field circuit.

For the purpose of changing the connections between the field windings and the supply source 23 from series to parallel electromagnetically operated switches 30, 31 and 32 are provided. A dynamic braking resistor 33 may be connected across the three-phase armature winding 10 by means of an electromagnetic switch 34, which is normally open. The armature winding 10 may be connected to a suitable three-phase supply source 35 to start the motor by means of a line switch 36 in the conductors 37, 38 and 39 leading from the supply source to the armature winding.

During normal running conditions the switch 36 is closed and held in closed position by an electromagnetically operated latch 40, a relay switch 41 actuated by the switch 36 being also closed. The manually operated control switch 42 connecting with a suitable source of supply 43 for the control circuit, which may be low or high voltage alternating or direct current, is likewise closed as is also the field switch 26. It will be understood that the synchronous motor may be started in any suitable manner, for example, by means of a squirrel cage winding, not shown, on its field member.

The switch 42 establishes a circuit for the operating coil 44 of the switch 31 whereby this switch is closed and the field windings are thereby connected all four in series relation across the supply source 23 as will be understood from an examination of Fig. 2. This circuit for the coil 44 leads from the supply main 43 through the switch 42, conductor 45, a relay switch 46 actuated by the switch 30 and closed when the switch 30 is open as shown, the coil 44, conductor 47 and switch 42 back to the other side of the source 43.

The field switching operations for establishing increased field excitation for braking the motor during stopping will be best understood in general from an examination of Fig. 2. With the series switch 31 closed and the motor running, the first step in establishing the increased field connections is to close the parallel switch 30 which connects the field windings 11 and 13 in series with each other directly across the supply source and also, it will be observed, establishes a short circuit connection around the field windings 12 and 14 and the series switch 31.

The next step is to open the series switch 31 which can now be done without appreciable arcing since the windings 11 and 13 are provided with a circuit through the supply source to take care of transient voltages. In the meantime the field of the motor is maintained at substantially normal value due to the fact that the flux linkages tend to remain constant during transient change and also due to the fact that the windings 11 and 13 now have double voltage applied to them. More particularly, when the switch 31 is opened, double current suddenly appears in the windings 11 and 13 by virtue of the tendency of the flux linkages to remain constant. This current is then maintained at this double value by the double voltage applied to these windings. The final step is the closing of the parallel switch 32 which connects the field windings 12 and 14 across the field supply source whereby double excitation is produced in the motor. It will be observed that the sequence of operation of the switches 30 and 32 may be reversed, if desired. It will also be observed that these switches establish parallel circuits respectively around the series switch 31 to the respective sides of the field supply source 23.

The arrangement of the windings for switching purposes in two groups, each group containing all north pole windings or all south pole windings, is an important feature of our invention. It will be understood that each field flux circuit is provided with a north pole field winding and a south pole field winding. The opening of the series switch 31, therefore, deenergizes only one winding associated with each flux circuit. The fact that the other windings are connected to the supply source at that time prevents arcing at the switch 31 because of the fact that these windings have a discharge path through the source of supply. On the other hand, if the windings were grouped indiscriminately so that the circuits of both windings of a particular field flux circuit were opened by the switch 31 damaging arcing at the switch would occur. Furthermore under such conditions the field flux would decrease greatly before the connections could be reestablished.

Referring again to Fig. 1, when it is desired to stop the motor, the operator presses a normally open push button 50 to initiate the sequence operation of the switches which is thereafter carried out automatically. The push button 50 closes a circuit through the coil 51 which actuates a trip for the latch 40. This trips the latch and allows the switch 36 to open in accordance with its spring bias. The circuit for the coil 51 leads from the supply main 43 through the push button 50, the coil 51 and relay switch 41 to the other side of the supply main. It will be observed that the switch 41 is opened when the switch 36 opens whereby the circuit of the coil 51 is opened.

Also the opening of the switch 36 closes the switch 52 actuated thereby, whereby a circuit is closed for the coil 53 which coil closes the switch 34 thus connecting the braking resistances 33 across the armature winding of the motor. This circuit for the coil 53 may be traced from the main of the supply source 43 through the switch 42, a manually operated switch 54 which is closed, switch 52, coil 53, conductor 47 and switch 42 back to the other side of the supply source.

A circuit is also closed by the push button 50 through the conductor 55 for the operating coil 56 of the switch 30, this circuit leading through the conductor 55, coil 56, conductor 47 and the switch 42 back to the supply source 43. This closes the switch 30, and at the same time opens the switch 46 actuated thereby, whereby the coil 44 is deenergized and the switch 31 allowed to open in accordance with its bias. The closing of the switch 30 also closes a relay switch 57 actuated thereby and the opening of the switch 31 closes a relay switch 58 actuated thereby. The switch 57 establishes a holding circuit for the coil 56, this circuit leading from the supply source 43 through the switch 42, the conductor 45, switch 57, and the coil 56 back to the supply source as previously traced. Consequently the button 50 can be released and allowed to open as soon as the switch 30 has closed. The closing of the switch 58 establishes a circuit for the operating coil 59 of the switch 32 whereby this switch 32 is closed, this circuit leading from the conductor 45 through the switch 57, the switch 58 and thence through the coil 59 to the conductor 47.

When the motor is to be restarted, the field excitation is removed by opening the switch 26. It is desirable to open the switch 42, although it may be immediately reclosed. Both switches may preferably be actuated by timing devices so that they are opened automatically a predetermined time interval after the motor has come to rest. The momentary opening and closing of switch 42 is for the purpose of deenergizing the coils 56 and 59 to open the switches 30 and 32, the switch 30, in opening, closing its relay switch 46 whereby the switch 31 is closed to establish the series connection of the field parts. To complete the starting, the switch 36 is closed. The closing movement of this switch first opens the relay switch 52 actuated thereby, whereby the coil 53 of the switch 34 is deenergized and the switch 34 allowed to open to disconnect the braking resistors 33.

While we have shown a particular embodiment of our invention, it will be understood of course that we do not wish to be limited thereto since many modifications may be made, and we therefore contemplate by the appended claims to cover any such modifications as fall within the true spirit and scope of our invention.

What we claim as new and desire to secure by Letters Patent of the United States is:

1. In the operation of an electric motor provided with a group of north pole field windings and a group of south pole field windings, the method of changing the connections of said field windings to give increased motor excitation while maintaining normal field excitation during such change which consists in applying double excitation to one of said groups of windings and then disconnecting the other group and connecting it in parallel with the first group for double excitation.

2. In the operation of an electric motor provided with a group of north pole field windings and a group of south pole field windings, the method of changing the connections of said field windings from series to parallel while maintaining normal field excitation during said change which consists in closing a circuit around one of said groups of windings so that the other group of windings is connected for double excitation, opening the series connection between said groups of windings while maintaining the connections of said first group of windings and then closing a circuit for the second group of windings.

3. The method of braking a synchronous motor having an armature connected to a polyphase supply source and a plurality of field windings connected in series to a direct current supply source, which consists in disconnecting said armature from the polyphase supply source, connecting a dynamic braking resistor across said armature, and changing the connections of said field windings from series to parallel to give increased excitation while maintaining the field excitation of said motor when the connections are being changed at least substantially as high as during running conditions.

4. The method of braking a synchronous motor having an armature connected to a polyphase supply source and a plurality of field windings connected in series to a direct current supply source, which consists in disconnecting said armature from the polyphase supply source, connecting a dynamic braking resistor across said armature and then changing the connections of said field windings from series to parallel to give increased excitation while maintaining the field excitation of said motor when the connections are being changed at least substantially as high as during running conditions by closing a circuit around one of said windings so that the other winding is connected for double excitation, opening the series connection between said windings while maintaining the connection of said first winding and then closing a circuit for the second winding.

5. The combination with a motor provided with a group of north pole field windings and a group of south pole field windings, of a series switch between said groups of field windings and parallel switches for establishing circuits around said series switch and the respective groups of field windings.

6. The combination of a motor provided with a group of north pole field windings and a group of south pole field windings, of a series switch between said groups of field windings, parallel switches for establishing circuits around said series switch and the respective groups of field windings, and means for operating said switches in a predetermined time sequence to change the connections of said groups of windings from series to parallel to give increased excitation for said motor while maintaining the field excitation of said motor when the connections are being changed at least substantially as high as during running conditions.

7. The combination with a motor provided with at least two field windings, of a series switch between said field windings, parallel switches for establishing circuits around said series switch and the respective field windings, means for closing one of said parallel switches, and means responsive to the closing of said parallel switch for effecting the sequence operation of said series switch and the other parallel switch so as to open said series switch and then close said other parallel switch.

8. The combination with a motor provided with at least two field windings, of a series switch between said field windings, parallel switches for establishing circuits around said series switch and the respective field windings, and means for effecting a predetermined sequence operation of said switches so as to first close one parallel switch, then open said series switch, then close the other parallel switch and means responsive to the opening of one of said parallel switches for reclosing said series switch.

9. The combination with a motor provided with a plurality of south pole field windings and a plurality of north pole field windings, of means connecting said windings of like polarity in series with each other to form two groups of respectively north and south pole field windings, means for connecting said groups in series with each other to a supply source for normal excitation and means for connecting said groups in parallel with each other for increased excitation.

10. The combination with a motor provided with a plurality of south pole field windings and a plurality of north pole field windings, of means connecting said windings of like polarity in series with each other to form two groups of respectively north and south pole field windings, means for connecting said groups in series with each other to a supply source for normal excitation including a series connection between said groups, and means for connecting each of said groups directly to the supply source for double excitation.

11. The combination with a motor provided with a plurality of south pole field windings and a plurality of north pole field windings, of means connecting said windings of like polarity in series with each other to form two groups of respectively north and south pole field windings, means for connecting said groups in series with each other to a supply source for normal excitation including a series switch between said groups, and parallel switches for establishing circuits around said series switch and the respective groups of field winding.

12. A dynamic braking system for a synchronous motor provided with an armature and at least two field windings, comprising a dynamic braking resistance, a switch for connecting said resistance across said armature, a series switch between said field windings for connecting said field windings in series to a supply source, parallel switches for establishing circuits around said series switch to the respective sides of the supply source, means for closing one of said parallel switches, means responsive to the closing of said parallel switch for opening said series switch, and means responsive to the opening of said series switch for closing the other parallel switch to connect said field winding in parallel.

13. A dynamic braking system for a synchronous motor provided with an armature and at least two field windings, comprising a dynamic braking resistance, a switch for connecting said resistance across said armature, a series switch between said field windings for connecting said field windings in series across a supply source, two parallel switches for establishing circuits around said series switch to the respective sides of the supply source, and manually controlled means for effecting a predetermined sequence operation of said switches so as to first connect said resistance across said armature and then connect said field windings in parallel by closing one parallel switch, opening said series switch and then closing the other parallel switch.

14. The combination with a synchronous motor provided with an armature and at least two field windings of a switch in the circuit of said armature, a resistor, an electromagnetically operated braking switch for connecting said resistor across said armature, an electromagnetically operated series switch between said field windings for connecting said field windings in series across a supply source during motoring operation, two electromagnetically operated parallel switches for establishing circuits around said series switch to the respective sides of the supply source, manually controlled means for closing said braking switch and one of said parallel switches, and means responsive to the closing of said parallel switch for effecting a predetermined sequence operation of said series switch and the other parallel switch so as to connect said field windings for increased field excitation of said motor while maintaining running excitation during the period in which said field connections are being changed.

15. The combination with a synchronous motor provided with an armature, a group of north pole field windings and a group of south pole field windings, of an electromagnetically operated switch in the circuit of said armature, a resistor, an electromagnetically operated braking switch for connecting said resistor across said armature, an electromagnetically operated series switch between said groups of field windings for connecting said groups of field windings in series across a supply source during motoring operation, two electromagnetically operated parallel switches for establishing circuits around said series switch to the respective sides of the supply source, a manually operated switch for controlling the opening of said armature switch and the closing of one of said parallel switches, means responsive to the opening of said armature switch for closing said braking switch, means responsive to the closing of said parallel switch for opening said series switch, and means responsive to the opening of said series switch for closing the other parallel switch to connect said groups of field windings in parallel with each other.

CHARLES E. KILBOURNE.
THEODORE DREIER.